US012695011B2

(12) United States Patent
Kim et al.

(10) Patent No.: US 12,695,011 B2
(45) Date of Patent: Jul. 28, 2026

(54) METHOD FOR MANUFACTURING MAGNETIC HEATING ELEMENT PARTICLES, CONDUCTIVE PASTE, AND METHOD FOR FORMING CONDUCTIVE FILM USING SAME

(71) Applicants: LG ELECTRONICS INC., Seoul (KR); INDUSTRY-UNIVERSITY COOPERATION FOUNDATION HANYANG UNIVERSITY ERICA CAMPUS, Gyeonggi-do (KR)

(72) Inventors: Soongil Kim, Seoul (KR); Hongcheol Lee, Seoul (KR); Hongjung Kim, Seoul (KR); Jongdeok Kim, Seoul (KR); Jongryeol Kim, Seoul (KR); Minyeol Kim, Seoul (KR)

(73) Assignees: LG ELECTRONICS INC. and INDUSTRY-UNIVERSITY, Seoul (KR); COOPERATION FOUNDATION HANYANG UNIVERSITY, Gyeonggi-Do (KR)

( * ) Notice: Subject to any disclaimer, the term of this patent is extended or adjusted under 35 U.S.C. 154(b) by 851 days.

(21) Appl. No.: 17/999,705

(22) PCT Filed: May 26, 2020

(86) PCT No.: PCT/KR2020/006784
§ 371 (c)(1),
(2) Date: Nov. 22, 2022

(87) PCT Pub. No.: WO2021/241769
PCT Pub. Date: Dec. 2, 2021

(65) Prior Publication Data
US 2023/0215607 A1 Jul. 6, 2023

(51) Int. Cl.
*H01F 1/147* (2006.01)
*C09D 5/24* (2006.01)
(Continued)

(52) U.S. Cl.
CPC ............... *H01F 1/147* (2013.01); *C09D 5/24* (2013.01); *C09D 7/61* (2018.01); *C09D 7/68* (2018.01);
(Continued)

(58) Field of Classification Search
CPC ........ H01F 1/147; H01F 1/1535; H01F 41/16; H01F 1/08; C22C 33/04; C22C 38/16; C22C 2202/02; C22C 38/00; C22C 45/02
(Continued)

(56) References Cited

U.S. PATENT DOCUMENTS

| | | | | |
|---|---|---|---|---|
| 4,985,089 A | * | 1/1991 | Yoshizawa .......... | H01F 1/15358 148/306 |
| 8,182,620 B2 | * | 5/2012 | Ohta ....................... | C22C 45/02 148/306 |

(Continued)

FOREIGN PATENT DOCUMENTS

| | | |
|---|---|---|
| JP | 2004-047282 | 2/2004 |
| JP | 2019-151934 | 9/2019 |

(Continued)

OTHER PUBLICATIONS

Kwiyoung Lee, et.al. ["Changes in Microstructure and Magnetic Properties of Fe—B—Cu—C Ribbons", IEEE Transactions on Magnetics, vol. 55, No. 2, Feb. 2019] (Year: 2019).*

(Continued)

*Primary Examiner* — Sally A Merkling
*Assistant Examiner* — Nazmun Nahar Shams
(74) *Attorney, Agent, or Firm* — LEE, HONG, DEGERMAN, KANG & WAIMEY

(57) ABSTRACT

The present invention provides a method for manufacturing a conductive film, comprising the steps of: applying, to a (Continued)

substrate, a conductive paste dispersed in an organic material and comprising metal particles and Fe—B—Cu—C alloy magnetic heating element particles; and selectively sintering the applied conductive paste by means of induction heating so as to form a conductive film, wherein the magnetic heating element particles are implemented with crystallized Fe—B—Cu—C alloy particles. Therefore, it is possible to selectively form a conductive adhesive layer by sintering through induction heating. In addition, it is possible to produce an adhesive capable of low-temperature bonding by forming a magnetic heating element having crystal grains with a large coercive force through heat treatment after formation of an alloy.

5 Claims, 9 Drawing Sheets

(51) Int. Cl.

| | |
|---|---|
| *C09D 7/40* | (2018.01) |
| *C09D 7/61* | (2018.01) |
| *C09J 9/02* | (2006.01) |
| *C09J 11/04* | (2006.01) |
| *C22C 33/04* | (2006.01) |
| *C22C 38/00* | (2006.01) |
| *C22C 38/16* | (2006.01) |
| *H01F 41/14* | (2006.01) |

(52) U.S. Cl.
CPC ................. *C09D 7/69* (2018.01); *C09J 9/02* (2013.01); *C09J 11/04* (2013.01); *H01F 41/14* (2013.01); *C22C 33/04* (2013.01); *C22C 38/002* (2013.01); *C22C 38/16* (2013.01); *C22C 2202/02* (2013.01)

(58) Field of Classification Search
USPC .......................................................... 420/121
See application file for complete search history.

(56) References Cited

U.S. PATENT DOCUMENTS

| | | | |
|---|---|---|---|
| 2014/0239220 A1* | 8/2014 | Naoe ....................... | C22C 45/02 |
| | | | 428/401 |
| 2019/0010586 A1* | 1/2019 | Kim ......................... | H05K 9/00 |

FOREIGN PATENT DOCUMENTS

| | | |
|---|---|---|
| KR | 10-2018-0125825 | 11/2018 |
| KR | 10-2019-0023568 | 3/2019 |

OTHER PUBLICATIONS

J. Torrens-Serra. Et.al. ["Structure and thermomagnetic properties of powders produced from melt spun FeNbBCu ribbons", Journal of Non-Crystalline Solids 354 (2008) 3858-3863] (Year: 2008).*
2. Xingdu Fan et.al. ["Fe-based nanocrystalline FeBCCu soft magnetic alloys with high magnetic flux density", Journal of Applied Physics 109, 07A314 (2011) 3858-3863] (Year: 2011).*
Korean Intellectual Property Office Application No. 10-2022-7044727, Notice of Allowance dated Mar. 6, 2025, 2 pages.

* cited by examiner

100

200                    110

FIG. 12
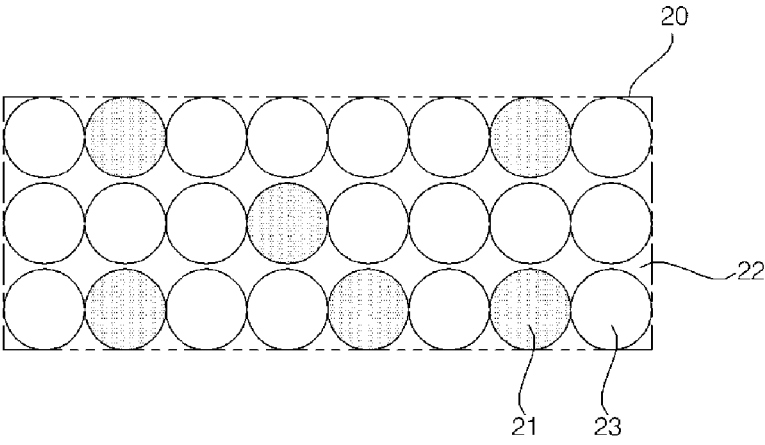
FIG. 13
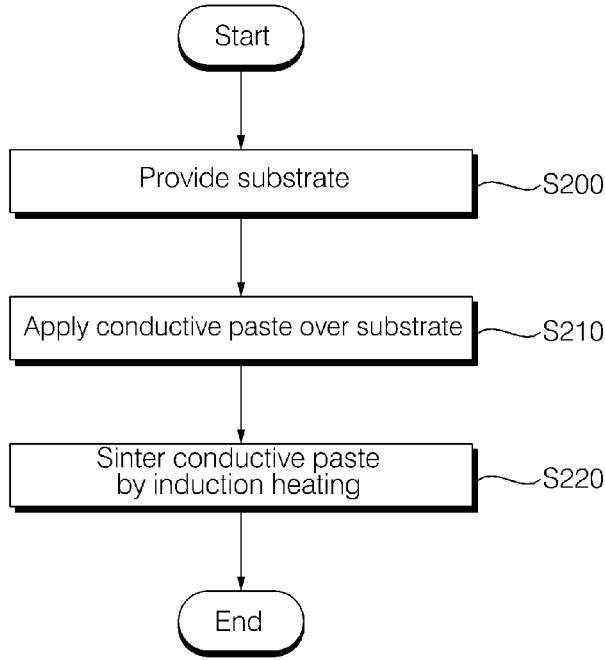
FIG. 14

METHOD FOR MANUFACTURING MAGNETIC HEATING ELEMENT PARTICLES, CONDUCTIVE PASTE, AND METHOD FOR FORMING CONDUCTIVE FILM USING SAME

CROSS-REFERENCE TO RELATED APPLICATION(S)

This application is the National Stage filing under 35 U.S.C. 371 of International Application No. PCT/KR2020/006784, filed on May 26, 2020, the contents of which are all incorporated by reference herein in its entirety.

BACKGROUND

Field of the Invention

The present invention relates to a method for manufacturing magnetic heating element particles, a conductive paste, and a method for producing a conductive film using the same, and more particularly, to a method of forming a conductive film by producing a heating element that generates high heat at a low frequency, forming a conductive paste including the same, and printing the same on a substrate.

Related Art

Currently, device bonding using a conductive adhesive of silver (Ag) paste is widely used as a bonding technology. As bonding using such a bonding paste, there are a pressurized method and a non-pressurized method.

In the case of the pressurized method, the bonding strength is very high by placing a desired chip over a silver paste and simultaneously performing sintering and bonding while applying heat and pressure at the same time, but there is a risk of deformation due to pressure applied to the device chip and the entire module.

In the case of the non-pressurized method, a method that promotes sintering by forming the size of silver particles very small and ensures the sintering speed by making it difficult to disperse has been proposed. However, since this method has weak bonding strength and requires a relatively high temperature, damage to an electronic device due to heat is an issue.

In this regard, as the related art, Korean Patent No. 10-976908 discloses that a magnetic heating element having magnetic susceptibility is mixed with metal particles and dispersed in a resin to form a conductive film, and such a conductive film may function as an adhesive layer.

Specifically, when induction heating is performed over the conductive film, the magnetic heating element is magnetized to generate heat, and by heating the metal particles by the heat, the metal particles may be melted and bonding may be performed.

However, in this related art, even the magnetic heating element is mixed on a nanoscale, which requires very fine particles ranging from 2 to 100 nm. Such a magnetic material has superparamagnetic characteristics and generates heat through Neel relaxation and Brownian relaxation. Such calorific value may be very small when magnetic characteristics are strong.

In addition, in the case of superparamagnetic particles, there is an issue that they need to be coated with a non-magnetic material to improve dispersibility, and a very high frequency current in the range of 10 kHz to 60 MHz, especially in the range of 50 kHz to 3 MHz, is required for induction heating.

Accordingly, it may affect other devices, and an issue occurs in sintering because heat generation is not performed smoothly at a frequency lower than the aforementioned ranges.

RELATED ART DOCUMENT

Patent Document

Korean Patent No. 10-976908 (publication date: Apr. 19, 2007)

SUMMARY

A first aspect of the present invention is to provide a conductive paste including magnetic heating element particles and capable of forming a conductive adhesive layer by sintering by heating generation through induction heating, and a method for manufacturing the same.

A second aspect of the present invention is to provide adhesive particles capable of attaining low-temperature bonding by forming a magnetic heating element having crystal grains with high force through heat treatment.

A third aspect of the present invention is to provide a conductive film capable of performing induction heating at a low frequency, thereby reducing heat applied from the outside to selectively heat only a portion where the conductive film is formed and to minimize the influence on other devices.

An embodiment of the present invention provides a method for manufacturing magnetic heating element particles, wherein the method includes: producing an Fe—B—Cu—C alloy ingot by mixing and melting Fe, B, C, and Cu in a predetermined content; rapidly solidifying the Fe—B—Cu—C alloy ingot to produce an amorphous alloy ribbon; heat-treating the amorphous alloy ribbon to a first temperature or higher to crystallize the same; and pulverizing the crystallized alloy ribbon to produce Fe—B—Cu—C alloy magnetic heating element particles.

A particle diameter of the magnetic heating element particles may be 100 nm to 100 μm.

A size of crystal grains of the magnetic heating element particles may be 50 nm to 300 nm.

The size of crystal grains of the magnetic heating element particles may be 70 nm to 150 nm.

The magnetic heating element particles may have a composition of $Fe_{84.3}B_{13.7}Cu_1C_1$.

The first temperature may be 500° C.

In the pulverizing of the crystallized alloy ribbon to produce Fe—B—Cu—C alloy magnetic heating element particles, the magnetic heating element particles may be produced by pulverizing the crystallized alloy ribbon at a low temperature with a cold ball grinder.

An embodiment of the present invention provides a method for manufacturing a conductive film, wherein the method includes: applying, to a substrate, a conductive paste dispersed in an organic material and including metal particles and Fe—B—Cu—C alloy magnetic heating element particles; and selectively sintering the applied conductive paste by means of induction heating so as to form a conductive film, wherein the magnetic heating element particles are implemented with crystallized Fe—B—Cu—C alloy particles.

In the induction heating, the conductive paste may be sintered through a magnetic field generated by a high frequency ranging from 1 kHz to 40 MHz.

The method may further include disposing an adhesive object over the conductive paste after applying the conductive paste on the substrate.

A particle diameter of the magnetic heating element particles may be 100 nm to 100 um.

A size of crystal grains of the magnetic heating element particles may be 50 nm to 300 nm.

The size of crystal grains of the magnetic heating element particles may be 70 nm to 150 nm.

The magnetic heating element particles may have a composition of $Fe_{84.3}B_{13.7}Cu_1C_1$.

The magnetic heating element particles may have crystal grains crystallized by heat treatment at 500° C. or higher.

The metal particles may be at least one of Ag, Ag, Al, Pt, Sn, Cu, Zn, Pd, and Ni.

In addition, an embodiment of the present invention provides an adhesive paste including: an organic material including an organic solvent and a dispersant; and magnetic heating element particles dispersed in the organic material and having an Fe—B—Cu—C composition, wherein the magnetic heating element particles are implemented with crystallized Fe—B—Cu—C alloy particles.

A particle diameter of the magnetic heating element particles may be 100 nm to 100 um.

A size of crystal grains of the magnetic heating element particles may be 50 nm to 300 nm.

The magnetic heating element particles may have a composition of $Fe_{84.3}B_{13.7}Cu_1C_1$.

Thereby, an embodiment of the present invention can selectively form a conductive adhesive layer by performing the sintering through induction heating.

In addition, it is possible to produce an adhesive capable of low-temperature bonding by forming a magnetic heating element having crystal grains with a large coercive force through heat treatment after formation of an alloy.

In addition, induction heating can be performed at a low frequency, thereby reducing external injection heat while selectively heating only a portion having a conductive film and minimizing the influence on other devices.

BRIEF DESCRIPTION OF THE DRAWINGS

FIG. 12 is a configuration diagram for explanation of FIG. 11.

FIG. 13 is a flowchart illustrating a method of forming the conductive film substrate of FIG. 1.

FIGS. 14 to 17 are process diagrams illustrating the process of FIG. 3.

DESCRIPTION OF EXEMPLARY EMBODIMENTS

Figure 1:
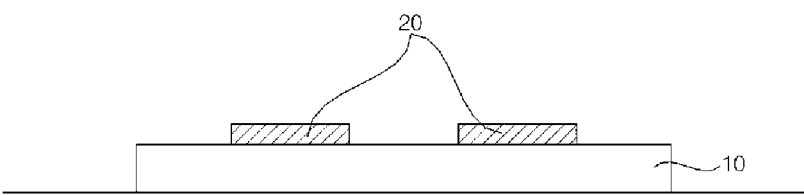
FIG. 1 illustrates a conductive film substrate according to an embodiment of the present invention.

Expressions referring to directions such as "front(F)/rear (R)/left(Le)/right(Ri)/up (U)/down (D)" mentioned below are defined as indicated in the drawings. However, the expressions are only to explain the present invention so that the present invention can be clearly understood, and the directions may be differently defined depending on a criterion.

Use of terms "first and second" in front of components mentioned below is only to avoid confusion of the referred component, and is independent of an order, importance, or master/slave relationship between the components. For example, an embodiment including only a second component without a first component can be implemented.

In the drawings, a thickness or a size of each component is exaggerated, omitted, or schematically illustrated for convenience and clarity of the explanation. The size and area of each component do not entirely reflect the actual size or area.

Moreover, an angle and a direction mentioned in describing a structure of the present invention are based on those described in the drawings. In description of a structure in the specification, if a reference point and a positional relationship with respect to the angle are not explicitly mentioned, reference is made to the related drawings.

Hereinafter, with reference to FIGS. 1 to 10, a conductive film substrate and a method for manufacturing magnetic heating element particles dispersed in the conductive film of an embodiment of the present invention will be described.

FIG. 1 illustrates a conductive film substrate according to an embodiment of the present invention.

Referring to FIG. 1, a conductive film 20 is formed by printing a conductive paste and then sintering the same by induction heating. In this connection, the conductive film 20 is formed including metal particles 21 and magnetic heating element particles 23 dispersed in an organic material 22.

The conductive film 20 is formed by selectively sintering only the conductive film 20 by induction heating after a conductive paste is applied or printed on an upper portion of a substrate 10. Herein, in the induction heating, when the magnetic heating element particles 23 included in the conductive paste receives magnetic force by induction heating from the outside, heat is generated on the surface of the magnetic heating element particles 23 and sintering of the metal particles 21 is performed.

The organic material 22 included in the conductive film 20 may include a dispersant or an organic solvent.

The dispersant is designed to prevent the metal particles 21 from being aggregated or agglomerated together, and the organic solvent is designed to mix all the components and is removed during a sintering process. When the molecular weight of the organic material 22 is too large, the thermal decomposition temperature is high so that high temperature heat treatment or long-time heat treatment is required. When the molecular weight of the organic material 22 is too small, it is easily dried in the air and it is difficult to secure flow characteristics, so that an appropriate organic material 22 suitable for process conditions is selected.

In addition, the organic material 22 may further include a binder, a catalyst, and the like.

For all organic materials 22, it is preferable to use those having a low carbon number, preferably 30 or less. When the number of carbon atoms is too large, the boiling point of the organic material 22 increases, so that during sintering (or bonding), the dispersant remains inside the paste. This may cause issues with the sintering density (or bonding strength) and reliability.

The metal particles 21 impart electrical conductivity of the conductive film 20 as a main material configuring the conductive paste. Since the metal particles 21 are present in a particulate form, sintering is required at a specific temperature (metal melting temperature) or higher to have electrical conductivity, and a low melting temperature is required for selective melting, in other words, in order not to affect another device.

To this end, the metal particles 21 of the present embodiment may secure electrical conductivity by miniaturizing a particle size to a nano size. For example, the metal particles 21 may include at least one of Ag, Ag, Al, Pt, Sn, Cu, Zn, Pd, and Ni.

The metal particles 21 may have an average particle diameter of 10 nm to 100 um, preferably 10 nm to 50 um, more preferably 10 nm to 10 um, and most preferably 10 nm to 5 um.

When the particle diameter is smaller than the above range, the content of the organic dispersant present on the surface of the metal particles 21 is rapidly increased, and the residual carbon during sintering increases, so that the sintering density and electrical conductivity may be lowered. When the size of the particles is too large, the sintering temperature to secure electrical conductivity increases, which may cause thermal damage to a product.

The shape of the metal particles 21 may be implemented in various ways, and various shapes of the metal particles 21 may be mixed and used according to the field of application, such as a spherical shape, a cylindrical shape, a needle shape, a plate shape, and a wire shape.

The aspect ratio (ratio of width to height) of the metal particles 21 may be variably changed according to the sintering temperature and the initial packing density.

The magnetic heating element particles 23 that are mixed and dispersed with the metal particles 21 are triple metal compounds having iron (Fe) as a main material, and are defined as materials satisfying the following formula.

$$Fe_a B_b Cu_c C_d \qquad \text{[Formula 1]}$$

In this connection, the formula is composed of Fe (iron), B (boron), Cu (copper), and C (carbon), and may be composed of one or more element combinations.

In addition, a+b+c+d=100 is satisfied, and each constant satisfies the following.

82≤a≤86, 13≤b≤15, 0.5≤c≤1.2, 0.5≤d≤1.2

The magnetic heating element particles 23 may be representatively $Fe_{84.3}B_{13.7}Cu_1C_1$.

The magnetic heating element particles 23 have a variable power particle diameter according to the magnitude of energy used during a powder pulverization process after heat treatment, but have a wide particle size distribution of approximately 500 nm to 20 um when cold hand milling pulverization is applied, and preferably may be formed to have a size of 1 or less by pulverization with a cold ball grinder.

In this connection, the size of one crystal grain by heat treatment in each particle is preferably 50 nm to 300 nm, more preferably 60 nm to 200 nm, and most preferably 70 nm to 150 nm.

The magnetic heating element particles 23 are induction heated to sinter the metal particles 21 present in the conductive paste. When the crystal grain of each crystal is 40 nm or less or 500 nm or more, the coercive force is not large and the calorific value may be rapidly reduced.

The shape of the magnetic heating element particles 23 may be applied in various forms such as spherical, plate-shaped, and needle-shaped, and the magnetic heating element particle 23 may satisfy 0.01 to 50 wt % or PHR (parts per hundred) with respect to the metal particles 21, and preferably 1 to 40 wt %, more preferably 5 to 30 wt %, and most preferably 10 to 20 wt %.

When the content of the magnetic heating element particle 23 is high, the sintering density (bonding strength) is low. When the content of the magnetic heating element particles 23 is low, it is difficult to shorten the sintering (bonding) process time, but this reduces the size of the metal particles 21 and satisfies the optimal conditions by reducing the content of the magnetic heating element particles 23.

As such, the conductive paste used to form the conductive film 20 has a wide thickness of 0.0001 mm (0.1 um or 100 nm) to 50 mm (5 cm), preferably 0.0005 mm (0.5 um or 500 nm) to 10 mm (1 cm), and more preferably 0.001 mm (1 um or 1000 nm) to 0.5 mm (500 um). When the thickness of the conductive paste is too thick, it takes a long time to remove the organic material 22 present in the paste, so it may be adjusted within the above thickness.

The conductive film 20 is formed by applying or printing the conductive paste and sintering the same through induction heating.

In this connection, the substrate 10 may be a substrate 10 of various materials, and even when the substrate 10 is a flexible substrate 10, the substrate 10 may not be deformed by low-temperature sintering by selective induction heating.

The conductive paste for forming the conductive film 20 is formed by mixing the metal particles 21 and the magnetic heating element particles 23 dispersed in the organic material 22 as described above. In addition, it is possible to form the conductive film 20 in which electrical conductivity and device stability are secured by heating and melting the adjacent metal particles 21 by induction heating of the magnetic heating element particles 23. In addition, when sintering by induction heating proceeds, it is economical because sintering proceeds in a short time while proceeding at a low temperature.

Hereinafter, a method for manufacturing magnetic heating element particles contained in the conductive paste will be first described with reference to FIGS. 2 and 3.

Figure 2:
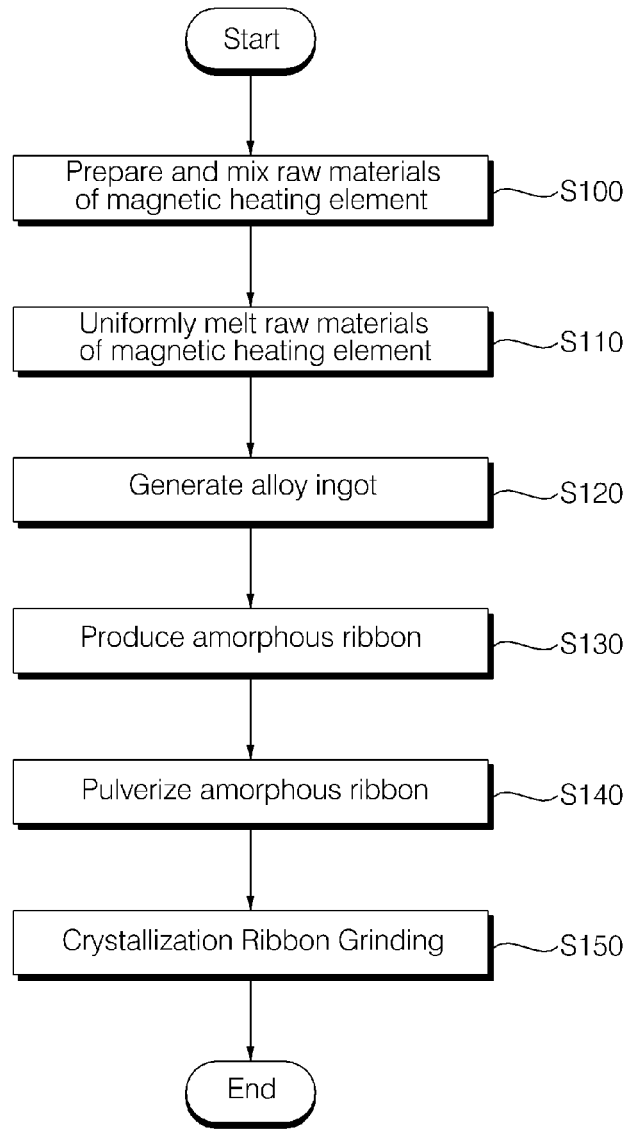
FIG. 2 is a flowchart illustrating a method for manufacturing a magnetic heating element to which the conductive film of FIG. 1 is applied.
Figure 3:
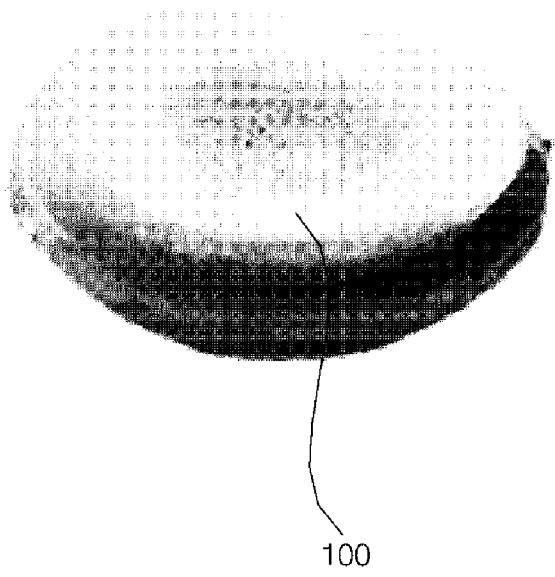
FIGS. 3 to 6 are conceptual diagrams illustrating manufacturing phases of the magnetic heating element of FIG. 2.
Figure 4:
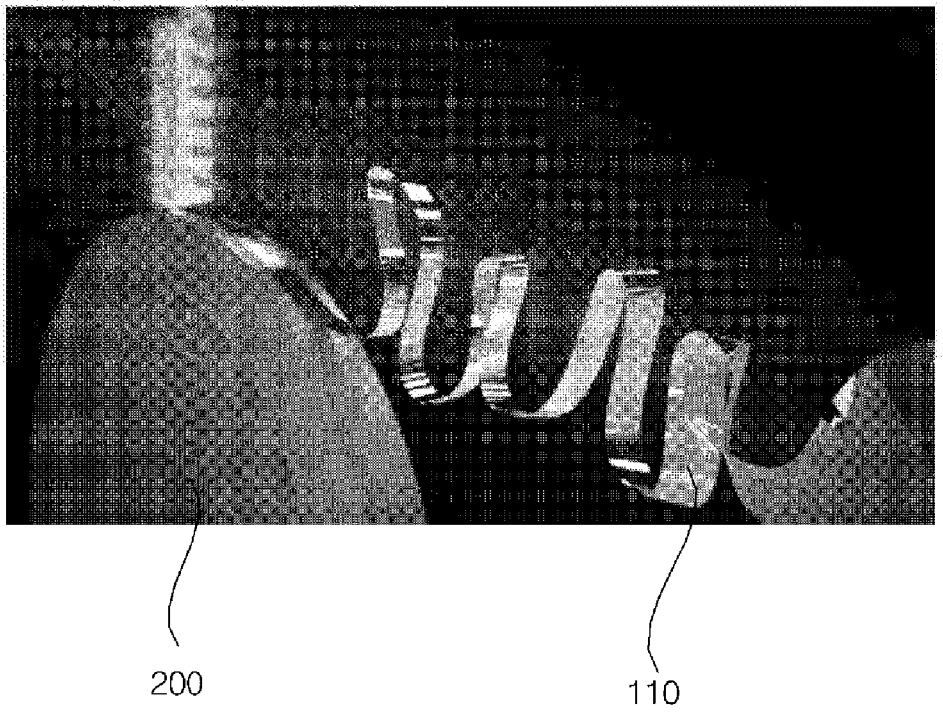
Figure 5:
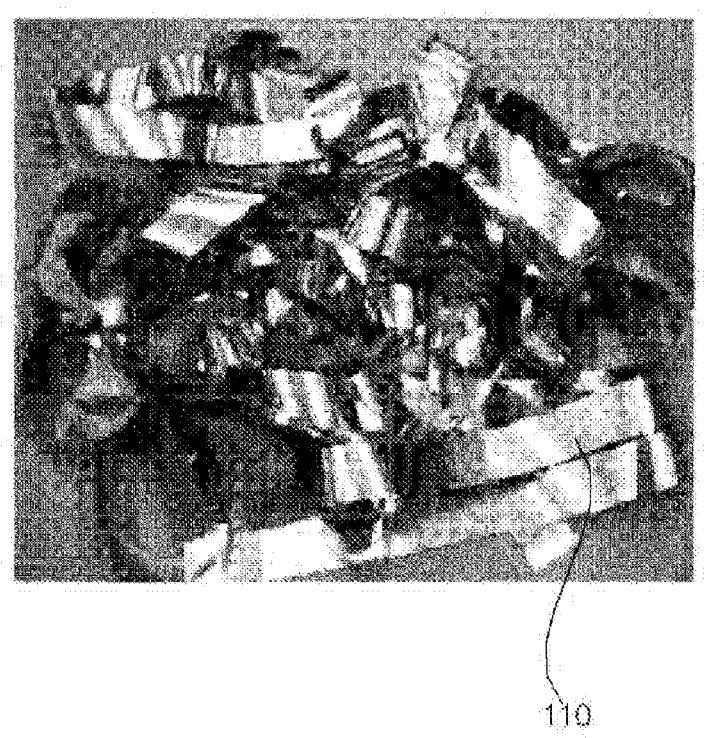
Figure 6:
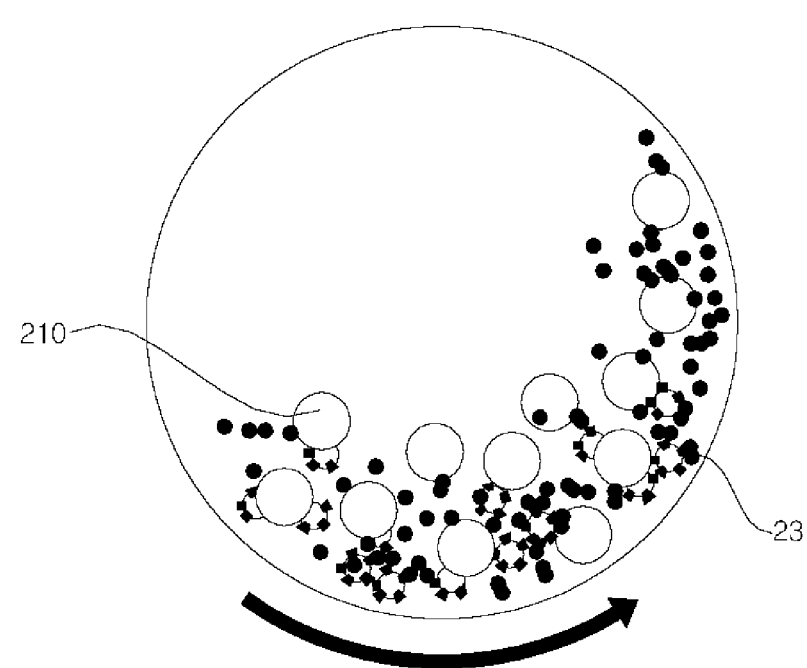
Figure 7:
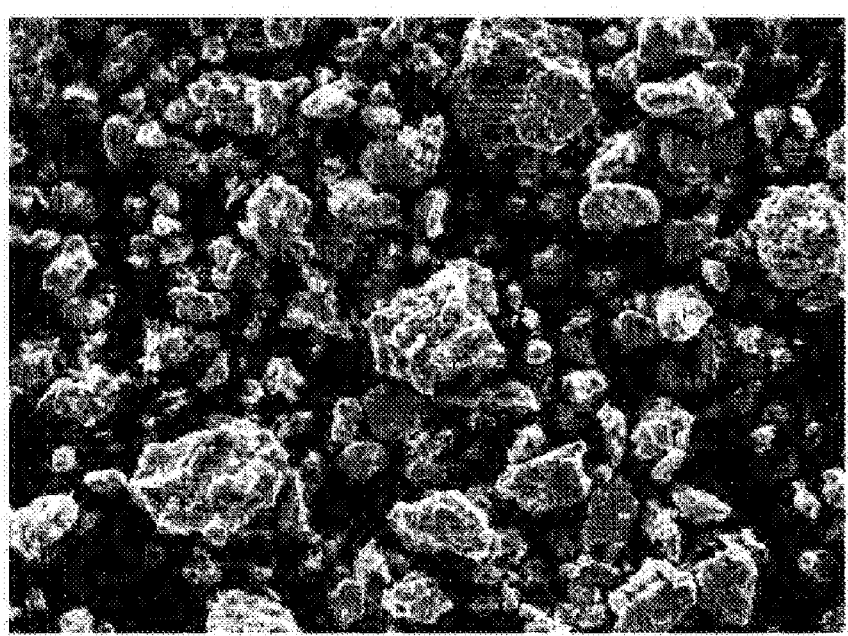
FIGS. 7 and 8 are photographs of magnetic heating element particles produced by FIG. 2.
Figure 8:
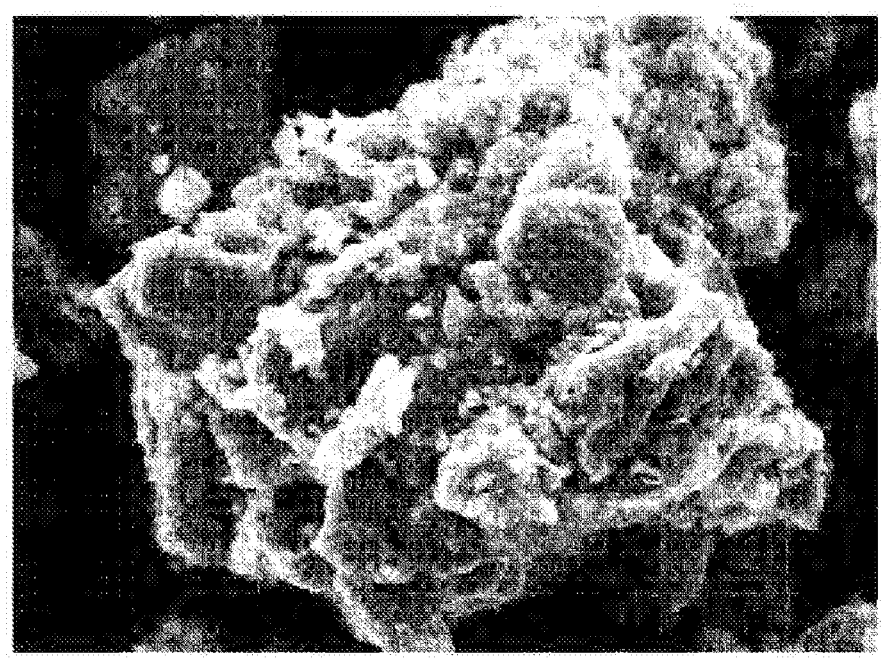
Figure 9:
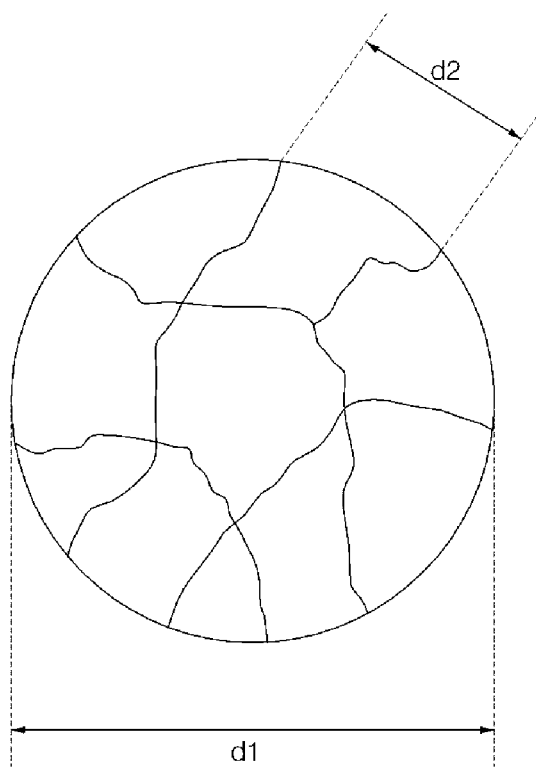
FIG. 9 is a conceptual diagram of magnetic heating element particles produced by FIG. 2.
Figure 10:
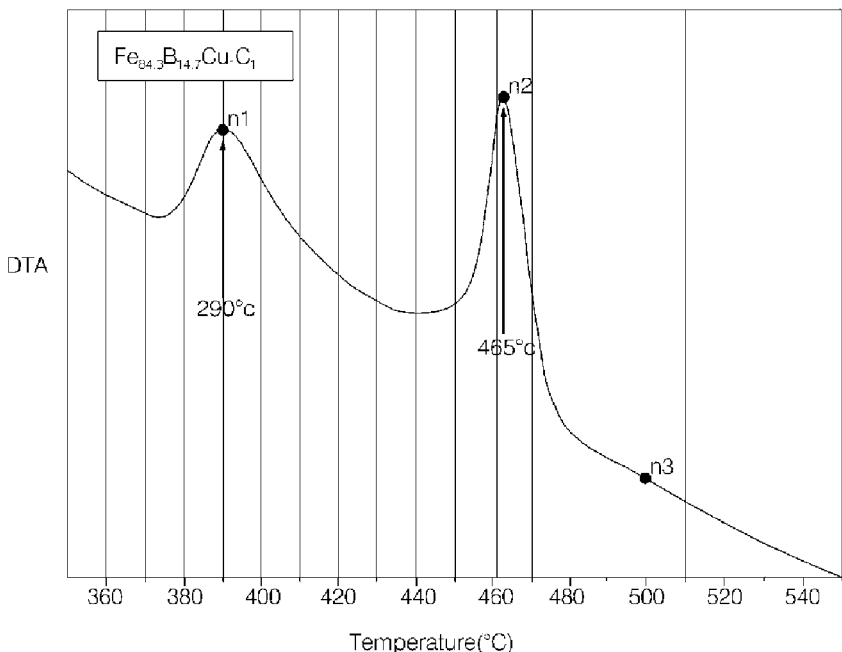
FIG. 10 is an analysis graph for heat treatment of the magnetic heating element particles produced by FIG. 2.

FIG. 2 is a flowchart illustrating a method for manufacturing a magnetic heating element to which the conductive film of FIG. 1 is applied. FIGS. 3 to 6 are conceptual diagrams illustrating manufacturing phases of the magnetic heating element of FIG. 2. FIGS. 7 and 8 are photographs of magnetic heating element particles produced by FIG. 2. FIG. 9 is a conceptual diagram of magnetic heating element particles produced by FIG. 2. FIG. 10 is an analysis graph for heat treatment of the magnetic heating element particles produced by FIG. 2.

Referring to FIGS. 2 to 6, as a method for producing magnetic heating element particles 23 according to an embodiment of the present invention, first, raw materials for producing the magnetic heating element particles 23 are prepared (S100).

Such a raw material may include a metal or material corresponding to each element in the form of a powder or a chip, fillet, or particle when the corresponding magnetic heating element particles 23 satisfy Formula 1.

In this connection, the corresponding metal or material is Fe (iron), B (boron), Cu (copper), and C (carbon), and they are prepared in a weight ratio selected according to Formula 1 and then mixed.

Next, the mixed magnetic heating element raw materials are uniformly melted (S110). This melting is uniformly melted by arc melting in an inert atmosphere, that is, argon gas or vacuum, to produce one alloy ingot 100 as shown in FIG. 3A (S120).

Such an ingot 100 may have a disk shape having a predetermined thickness, and an amorphous alloy ribbon is manufactured through a rapid solidification process as shown in FIG. 3B (S130).

Specifically, as shown in FIG. 3B, by placing the ingot 100 between a induction heating nozzle and a roll while rotating a roll 200 at a predetermined discharge pressure, the adhesive surface of the ingot 100 melts according to the rotation of the roll to manufacture an amorphous ribbon.

In this connection, the metal melting temperature is 120° C., the discharge pressure is 0.36 kgf/cm2, the rotational speed of the Cu roll 200 is 33.5 m/s, and rotation is performed in an inert atmosphere such as argon or vacuum.

The distance between the Cu roll 200 and the induction heating nozzle may be approximately 200 μm.

An amorphous ribbon 110 thus produced may have an amorphous state having the alloy of Formula 1 as a component, as shown in FIG. 3C.

Next, crystallization proceeds through heat treatment of the amorphous ribbon 110 (S140).

Specifically, crystallization of the amorphous ribbon 110 proceeds by supplying heat at a predetermined heat treatment temperature in an inert atmosphere such as argon or vacuum.

Such crystallization performs heat treatment at a heat treatment temperature of 500° C. to 600° C., preferably at a temperature of around 550° C., at a heating rate of 70 to 90° C./min, preferably 80° C./min, for about 5 minutes or less.

In this connection, since crystal grains are coarsened when the heating rate is slow, heat treatment is performed at the rate and within the time period.

When the heat treatment is completed in this way, crystal grains may be formed to have a predetermined size in the ribbon.

Next, cryogenic ball milling is performed as shown in FIG. 3D (S150).

In other words, ball milling is performed by rotating a chamber by injecting the crystallized alloy ribbon 110 together with a ball 210 into the chamber into which liquid nitrogen or the like is injected.

By such ball milling, the alloy ribbon 110 is pulverized into the magnetic heating element particles 23 having a predetermined size.

At this time, ball:ribbon=1:1 to 100:1 may be satisfied, the diameter of each ball may be 5 mm or less, the rotation speed of the chamber may satisfy 1 to 2,000 rpm, and −77K of liquid nitrogen may be injected for proceeding.

By such pulverization, the magnetic heating element particles 23 as shown in FIGS. 7 and 8 are formed.

Referring to FIGS. 7 and 8, the particle diameter of the magnetic heating element particles 23 may be adjusted according to the amount of energy applied during pulverization. Under the above conditions, the particle diameter of each particle may satisfy 500 nm to 20 um. When the particle diameter of the magnetic heating element particles 23 is 500 nm or less, the surface energy of the particle is increased and the possibility of oxidation of the metal-based magnetic heating element is high. When the particle diameter of the particle is 20 μm or more, the dispersity of the magnetic heating element is reduced, so there is a possibility that the bonding strength due to aggregation is reduced. Accordingly, it is possible to control the diameter rotation and temperature of the ball to satisfy the above range.

As such, when crystallization proceeds by heat treatment of the amorphous alloy ribbon, a plurality of crystal grains are present in one particle. As shown in FIG. 9, when the particle diameter of the particle d1 satisfies 500 nm to 20 um, the size of the crystal grain d2 satisfies, preferably 50 nm to 300 nm, more preferably 60 nm to 200 nm, and most preferably 70 nm to 150 nm.

When the size of the crystal grain is 40 nm or less or 500 nm or more, the coercive force is not large and the calorific value tends to decrease rapidly, thus making it difficult to function as a magnetic heating element.

In other words, referring to FIG. 10, the result of thermal analysis using a DTA (Different Thermogravimetric Analyzer) on an amorphous alloy ribbon is shown.

In FIG. 10, $Fe_{84.3}B_{13.7}Cu_1C_1$ was produced as an alloy, and amount of heat absorption was analyzed while heating at a heating rate of 10° C./min in an argon gas atmosphere.

As shown in the graph of FIG. 10, the amount of heat absorption tends to decrease according to the heating temperature as the heating proceeds. In this connection, it may be seen that the Fe—B—Cu—C($Fe_{84.3}B_{13.7}Cu_1C_1$) amorphous alloy ribbon shows sharp endothermic peaks at 390° C. (n1) and 465° C. (n2). Accordingly, it may be seen that crystallization occurs at 390° C. (n1) and 465° C. (n2).

Accordingly, in order to produce nanocrystal grains for maximization of magnetization value and minimization of coercive force, it is advantageous to perform heat treatment at 390° C. to 465° C. However, for a high-heating magnetic heating element as in an embodiment of the present invention, since the coercive force needs to be increased by 100 Oe or more, heat treatment is performed at 500° C. (n3) or higher.

The high-heating magnetic heating element particles 23 produced in this way may be used as an inorganic adhesive functioning as the conductive film 20 or a metal adhesive layer over the substrate 10 as shown in FIG. 1.

For example, as a glass sealing material, a mixture of glass frit and the high-heating magnetic heating element particles 23 of an embodiment of the present invention may be used. As shown in FIG. 1, the metal particles 21 and the high-heating magnetic heating element particles 23 of an embodiment of the present invention may be mixed and used as a solder.

It may be used as an organic adhesive, for example, a thermoplastic polymer-based adhesive, that is, a heat melting adhesive or a thermosetting polymer adhesive, that is, a heat-responsive adhesive, in which the magnetic heating element particles 23 of an embodiment of the present invention are dispersed as a filler in a polymer to perform the function of heating the polymer by organic heat generation.

In the case of a thermosetting adhesive, the high-heating magnetic heating element particles 23 of an embodiment of the present invention may be dispersed and used in a material including one or more components such as epoxy, urethane, silicone, unsaturated ester, urea, and phenol. In the case of a thermoplastic adhesive, the high-heating magnetic heating element particles 23 of an embodiment of the present invention may be dispersed and used in a material including one or more components such as vinyl acetate, polyvinyl alcohol, vinyl chloride, polyvinyl acetate, acrylic, saturated polyester, polyamide, and polyethylene.

In this connection, the high-heating magnetic heating element particles 23 of an embodiment of the present invention may have a difference in content to have optimal characteristics depending on the product to be applied, but may have a range of 0.1 to 30 vol %.

Referring to an example in which the high-heating magnetic heating element particles 23 of an embodiment of the present invention are utilized, when used in a dispersed manner with metal particles as shown in FIG. 1, a conductive paste therefor is first manufactured.

Hereinafter, a method for manufacturing a conductive paste will be described with reference to FIGS. 11 and 12.

Figure 11:
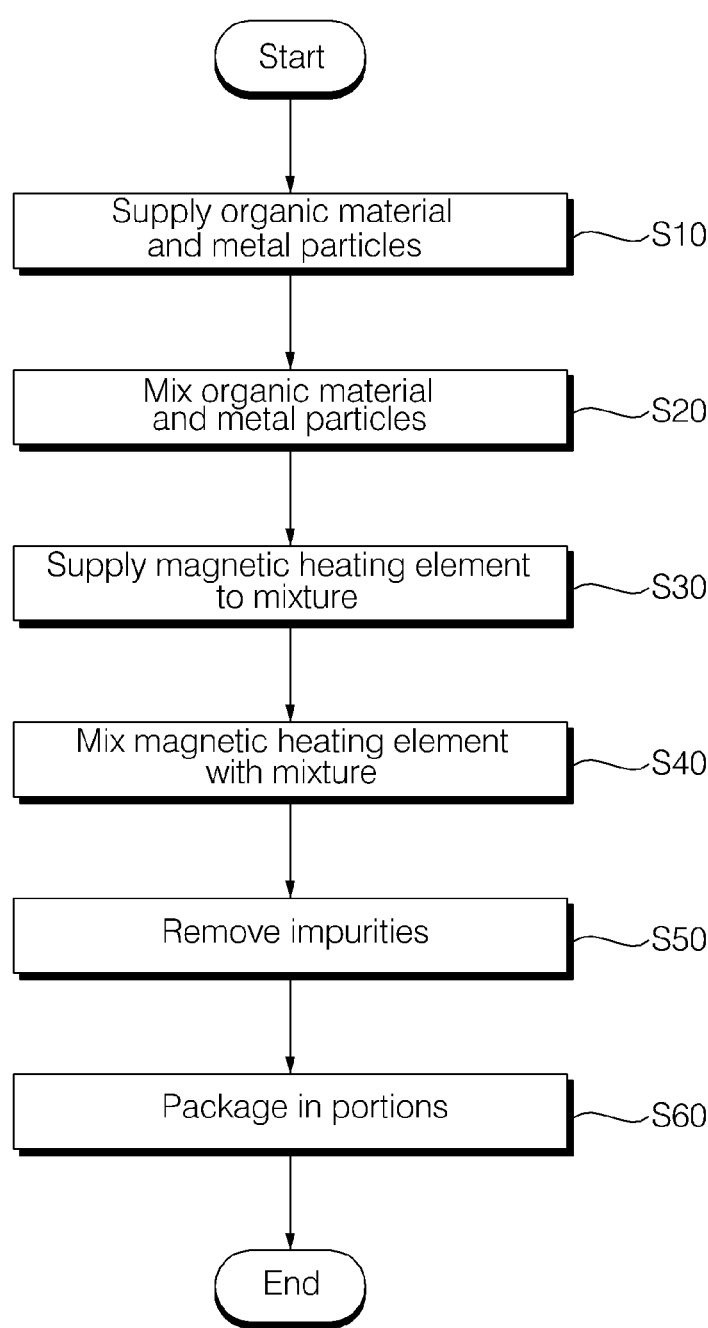
FIG. 11 is a flowchart illustrating a method for manufacturing a conductive paste for forming the conductive film of FIG. 1.

Referring to FIG. 11, the organic material 22 and the metal particles 21 are supplied (S10).

The organic material 22 may include the aforementioned organic solvent and dispersant binder.

In this connection, the organic solvent may be formed of a mixture of ethylene carbonate (EC) and Texanol Ester Alcohol (texanol). The dispersant may use a mixture of one or more selected from carboxylic acids, amines, and alcohols. These dispersants may organically coat the surface of the metal particles 21 to improve dispersibility in organic solvents.

In addition, it may further include a binder and a reducing agent, and the dispersant prevents the metal particles 21 from being aggregated or agglomerated together. In other words, in producing the paste, it is prevented that the metal particles 21 are attached to each other to form agglomeration. Herein, the dispersant may include at least one of alkylamine, polyamine, carboxylic acid, polycarboxylic acid, carboxylate, polycarboxylate, carboxylic acid amide, polycarboxylic acid amide, alkyl alcohol, polyalcohol, alkyl thiol, poly thiol, and poly ether.

The binder increases strength by imparting elasticity and adhesion to the metal particles 21 when producing the paste, and may preferably be polyvinylpyrrolidone (PVP).

In addition, various additives capable of improving the characteristics of the metal particles 21 and the magnetic heating element particles 23 may be added.

As described above, the metal particles 21 may include at least one of Ag, Ag, Al, Pt, Sn, Cu, Zn, Pd, and Ni. The metal particles 21 may have an average particle diameter of 10 nm to 100 um, preferably 10 nm to 50 um, more preferably 10 nm to 10 um, and most preferably 10 nm to 5 um.

Next, the organic material 22 and the metal particles 21 are mixed (S20).

In this connection, as a mixing method, chemical solvent mixing or high temperature mechanical mixing may be performed, without being limited thereto.

The materials mixed as such have a form in which the metal particles 21 are smoothly dispersed in the organic material 22.

Next, the magnetic heating element particles 23 of an embodiment of the present invention produced by FIG. 2 for supplying a secondary raw material is prepared (S30).

The magnetic heating element particles 23 of an embodiment of the present invention produced by FIG. 2 may include the Fe—B—Cu—C alloy of Formula 1, and is formed into particles having a crystalline form by heat treatment. For example, it may be $Fe_{84.3}B_{13.7}Cu_1C_1$, and is a material capable of generating heat by an alternating magnetic field generated in high-frequency induction heating.

The shape of the magnetic heating element particles 23 may be applied in various forms such as spherical, plate-shaped, needle-shaped, and the like. The heating element particles 23 may be 0.01 to 50 wt % with respect to the metal particles 21, preferably 1 to 40 wt %, more preferably 5 to 30 wt %, and most preferably 10 to 20 wt %.

The magnetic heating element particles 23 of a predetermined ratio are mixed into a mixed material of the organic material 22 and the metal particles 21 (S40).

Also in that case, as a mixing method, chemical solvent mixing or high temperature mechanical mixing is applicable.

The particle diameter of the magnetic heating element particles 23 may satisfy 500 nm to 20 um, and the size of the crystal grain may preferably satisfy 50 nm to 300 nm, more preferably 60 nm to 200 nm, and most preferably 70 nm to 150 nm.

In this connection, since the metal particles 21 and the magnetic heating element particles 23 are similar in size and the number thereof is less than that the magnetic heating elements particles 23, the magnetic heating element particles 23 may be disposed with a smaller density than the metal particles 21 as shown in FIG. 3B.

Next, filtering is performed (S50). Filtering is performed to remove impurities by performing heat treatment or the like. First, large aggregates may be removed through physical filtering, and impurities may be removed by secondarily performing chemical filtering.

Next, it may be packaged in portions into an appropriate amount to form a conductive paste (S60).

The conductive paste produced in this way may be provided as a solder for conductive adhesion between devices, and may be applied to small electronic devices such as light emitting devices and solar cells.

Hereinafter, the production of the conductive film 20 using the conductive paste as shown in FIG. 1 will be described in detail with reference to FIGS. 13 to 18.

FIG. 13 is a flowchart illustrating a method of forming the conductive film substrate of FIG. 1. FIGS. 14 to 17 are process diagrams illustrating the process of FIG. 3. FIG. 18 is a graph illustrating a magnetization value different from coercive force of the magnetic heating element particles 23 according to an embodiment of the present invention.

Referring to FIG. 13, the substrate 10 is provided as shown in FIG. 14 (S100).

The substrate 10 may be mainly a printed circuit board 10, and may be a flexible substrate 10 or a rigid substrate 10. As a material of the substrate 10, various materials such as metal, organic, and inorganic materials may be used. The substrate 10 may be a wiring board 10, a heat sink, or the like. In the case of the heat sink, it may be a metal plate.

In this connection, a conductive paste used as a solder is applied to a predetermined position over the substrate 10 (S210).

Figure 15:
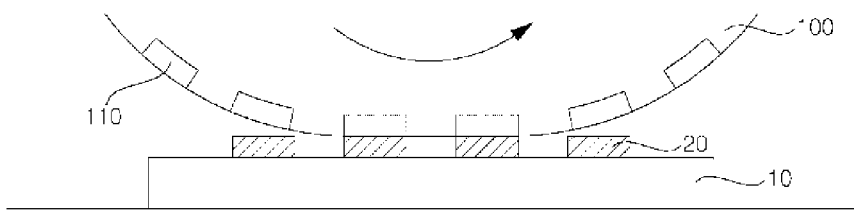

Such application of the conductive paste may be performed by applying the conductive paste accommodated in a groove 110 of a roll 100 to the corresponding position in a roll-to-roll method, or by printing as shown in FIG. 15, without being limited thereto.

The printing method may be performed by any one of screen printing, inkjet, gravure, flexo, offset, and aerosol.

Figure 16:
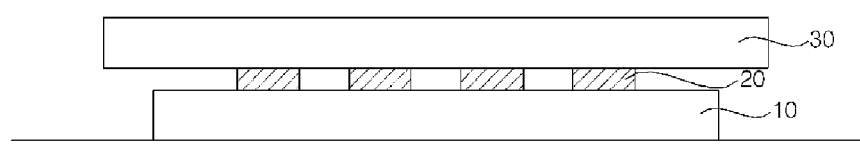

When the conductive paste is applied in a specific shape over the substrate 10 in this way, it is disposed so as to be in contact with a bonding terminal of a device 30 to be bonded as shown in FIG. 16.

In this connection, the device 30 to be bonded may be various electronic components or may be a part of another printed circuit board 10.

Figure 17:
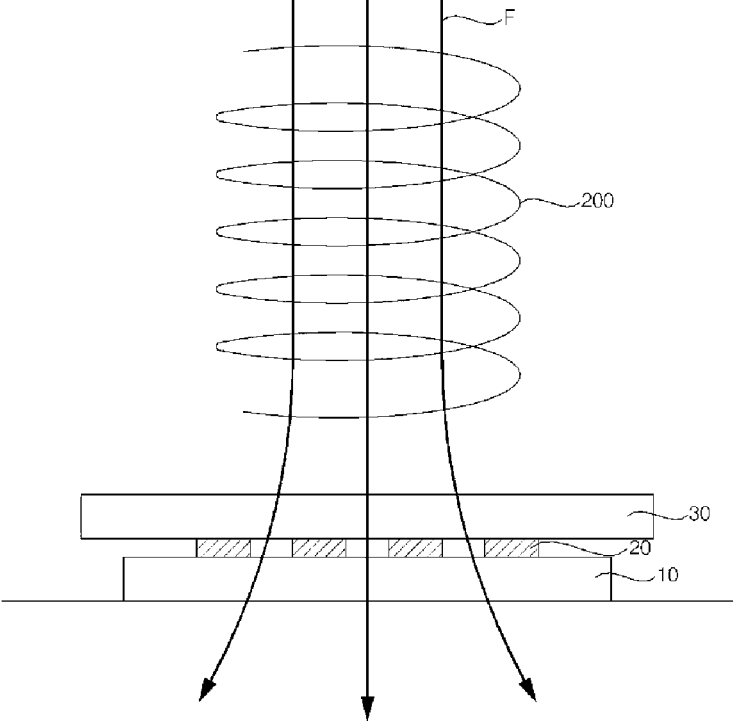
Figure 18:
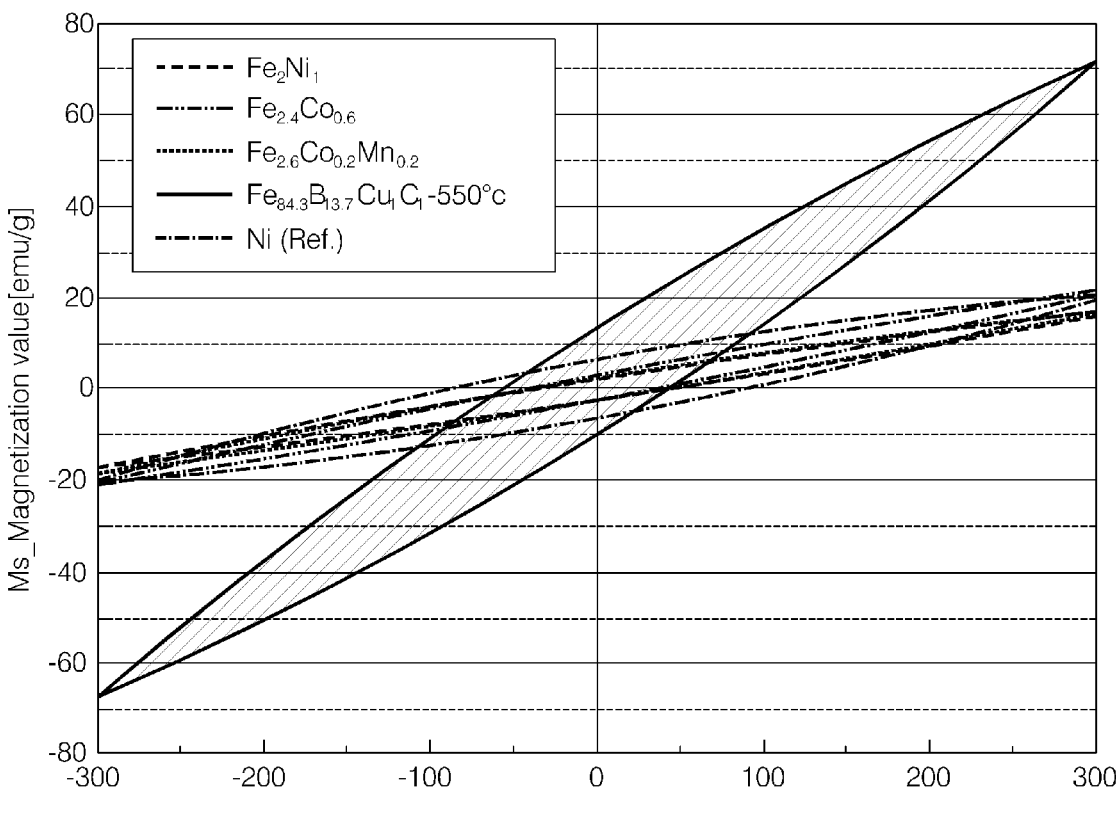
FIG. 18 is a graph illustrating a magnetization value different from coercive force of the magnetic heating element particles according to an embodiment of the present invention.

Next, induction heating is performed as shown in FIG. 17 (S220).

Induction heating may be implemented by an inductor oven, and a line of magnetic force passing through a corresponding conductive film is generated by flowing a predetermined high-frequency current to a coil of the inductor oven. In this connection, the high frequency may use a frequency of 50 kHz to 10 MHz.

In this connection, after primary sintering of the metal particles 21 by the self-heating (Hysteresis Loss) of the magnetic heating element particles 23 in the conductive film by the line of magnetic force, the quasi-bulk metal particles 21 undergo secondary self-heating (Eddy Current Loss) and are sintered.

Accordingly, the secondary self-heating proceeds, the sintering speed is very fast, and thus the adhesion between the upper and lower substrates 10 is completed.

For the magnetic heating element particles 23 in the adhesive conductive film 20 formed as described above, the saturation magnetization value, coercive force, and loss energy according to the strength of the external magnetic field in the case of the composition of Formula 1 were measured as shown in Table 1.

In this connection, in Table 1, various materials were measured for comparison other than the composition of Formula 1 applied in an embodiment of the present invention.

12

As a result of comparing magnetic characteristics with Ni as a standard sample (Ref), the coercive force of $Co_{0.2}Fe_{2.8}O_4$ is the highest at the strength of an external electromagnetic field of 15 kOe, and the magnetization value of $Fe_{84.3}B_{13.7}Cu_1C_1$-550° C. is the highest.

In this connection, when the strength of the external electromagnetic field is weakened to 300 Oe, the area of the loss energy is rapidly reduced, and the coercive force is low at 106.1 Oe. However, it may be seen that the composition of $Fe_{84.3}B_{13.7}Cu_1C_1$-550° C. with the highest magnetization value has a 187% higher magnitude of loss energy than the standard sample Ni.

However, in the case of $Fe_{2.4}Co_{0.6}$, which has a magnetization value similar to $Fe_{84.3}B_{13.7}Cu_1C_1$-550° C. and large coercive force, the magnitude of loss energy is as low as 43% compared to Ni, which means that the calorific value is quite low.

Accordingly, when the strength of the external electromagnetic field is 300 Oe, it may be seen that $Fe_{84.3}B_{13.7}Cu_1C_1$ of an embodiment of the present invention is effective in securing a large calorific value by having large coercive force.

In addition, it may be seen that even in the composition of $Fe_{84.3}B_{13.7}Cu_1C_1$, there is a large difference in the coercive force value depending on the heat treatment tempera-

TABLE 1

| Composition of magnetic heating element Composition | | Heat treatment Temperature (Crystallization) | Strength of external electromagnetic field | | | | | | | | | |
| --- | --- | --- | --- | --- | --- | --- | --- | --- | --- | --- | --- | --- |
| | | | 15 kOe | | 700 Oe | | | | 300 Oe | | | |
| | | | | | | | BH | | | | BH | |
| | | | $M_s$ [emu/g] | Hc [Oe] | $M_s$ [emu/g] | Hc [Oe] | kJ/$m^3$ | % | $M_s$ [emu/g] | Hc [Oe] | kJ/$m^3$ | % |
| | Ni (Ref.) | — | 51 | 169.3 | 37.2 | 140.9 | 13.5 | 100% | 20.3 | 82.8 | 4.2 | 100% |
| Oxide-based | $Fe_3O_4$ | — | 89 | 173.6 | 64.3 | 147.6 | 14.7 | 109% | 34.1 | 96.7 | 4.9 | 116% |
| | $Co_{0.2}Fe_{2.8}O_4$ | — | 87 | 267.8 | 55.5 | 225.5 | 19.9 | 147% | 20.6 | 72.5 | 2.4 | 56% |
| | $Mn_{0.2}Fe_{2.8}O_4$ | — | 88 | 171.3 | 61.2 | 142.5 | 13 | 97% | 31.6 | 84.7 | 3.8 | 89% |
| | $Co_{0.2}Mn_{0.2}Fe_{2.6}O_4$ | — | 87 | 243.9 | 52.5 | 194.5 | 15.7 | 116% | 21 | 79.3 | 2.4 | 56% |
| Metal-based | $Fe_{2.6}Co_{0.2}Mn_{0.2}$ | — | 171 | 379.5 | 55.2 | 200.6 | 28 | 207% | 17.65 | 31.2 | 1.3 | 31% |
| | $Fe_{2.4}Co_{0.6}$ | — | 189 | 322.5 | 61.9 | 191.5 | 27.9 | 207% | 21.3 | 28.1 | 1.8 | 43% |
| | $Fe_2Ni_1$ | — | 159 | 390.3 | 52.6 | 230.6 | 26.5 | 196% | 17.1 | 41.4 | 1.8 | 41% |
| | $Fe_{84.3}B_{13.7}Cu_1C_1$ | 420° C. | 193 | 0.57 | — | — | — | — | — | — | — | — |
| | | 550° C. | 198 | 106.1 | 146 | 76.7 | 31 | 232% | 69.8 | 44.9 | 7.9 | 187% |

Referring to Table 1, the saturation magnetization value, coercive force and loss energy were measured while varying the strength of the external magnetic field for various magnetic heating elements.

Ms represents a saturation magnetization value, Hc represents coercive force, and BH represents a loss energy (hysteresis area), respectively.

Ni was calculated as a standard sample, $Fe_3O_4$, $Co_{0.2}Fe_{2.8}O_4$, $Mn_{0.2}Fe_{2.8}O_4$, $Co_{0.2}Mn_{0.2}Fe_{2.6}O_4$ was selected as an oxide-based magnetic heating element, and as a metal-based one, $Fe_{2.6}Co_{0.2}Mn_{0.2}$, $Fe_{2.4}Co_{0.6}$, and $Fe_2Ni_1$ were calculated, respectively, while including $Fe_{84.3}B_{13.7}Cu_1C_1$, which is an example of the present invention.

In this connection, for $Fe_{84.3}B_{13.7}Cu_1C_1$, which is an example of the present invention, the calculation was performed at 420° C. lower than the crystallization temperature and at 550° C. higher than the crystallization temperature.

ture, which is due to the difference in crystallization as described above. A desired calorific value may be secured by setting the heat treatment temperature to 500° C. or higher.

Referring visually to FIG. 18, when a magnetic heating element is implemented with various materials, self-heating values in the coercive force of each material, that is, a loss energy (hysteresis area) is shown.

When the energy loss is large, self-heating occurs very actively and may effectively function as a heating element.

FIG. 18 compares the magnitudes of self-heating values in an external magnetic field, that is, when the coercive force is 300 Oe.

For the measurement target, the material of the magnetic heating element was selected as $Fe_2Ni_1$, $Fe_{2.4}CO_{0.6}$, $Fe_{2.4}CO_{0.6}Mn_{0.2}$, $Fe_{84.3}B_{13.7}Cu_1C_1$-550° C., and Ni, and the self-heating value for each material is shown in FIG. 11.

According to FIG. 18, regarding Ni, which is the reference value, it may be seen that the hysteresis area, which is the loss energy, of the $Fe_2Ni_1$, $Fe_{2.4}Co_{0.6}$, $Fe_{2.4}Co_{0.6}Mn_{0.2}$ magnetic heating element is very small when the strength of the external magnetic field is 300 Oe. In addition, it may be seen that the crystal grain $Fe_{84.3}B_{13.7}Cu_1C_1$-550° C. subjected to post-heat treatment at 550° C. according to an embodiment of the present invention has a hysteresis area that is very large compared to Ni.

In other words, when the loss energy is very large, the caloric value is very large, so that it may efficiently function as a magnetic heating element during induction heating.

Accordingly, in the case where $Fe_{84.3}B_{13.7}Cu_1C_1$-subjected to heat treatment at 550° C. is included as magnetic heating element particles, when used as an organic adhesive or a conductive adhesive layer, the adhesive function may be activated by selective heat generation by induction heating, Moreover, even when low heat is applied to the outside, self-heating occurs very actively, so the desired adhesive function may be secured.

Hereinbefore, although preferred embodiments of the present invention have been illustrated and described, the present invention is not limited to the specific embodiments described above, and it goes without saying that persons having ordinary skills in the technical field to which the present invention pertains may implement the present invention by various modifications thereof without departing from gist of the present invention defined by the claims, and such modifications are within the scope of the claims.

DESCRIPTION OF REFERENCE NUMERALS

10: Substrate 20: Conductive film
21: Metal particles 23: Magnetic heating element particles

14

What is claimed is:

1. A method for manufacturing magnetic heating element particles, the method including:

producing an Fe—B—Cu—C alloy ingot by mixing and melting Fe, B, C, and Cu in a predetermined content;

rapidly solidifying the Fe—B—Cu—C alloy ingot to produce an amorphous alloy ribbon;

heat-treating the amorphous alloy ribbon to a first temperature or higher to crystallize the same; and pulverizing the crystallized alloy ribbon to produce Fe—B—Cu—C alloy magnetic heating element particles, wherein a size of crystal grains of the magnetic heating element particles is 70 nm to 300 nm.

2. The method of claim 1, wherein a particle diameter of the magnetic heating element particles is 100 nm to 100 μm.

3. The method of claim 1, wherein the magnetic heating element particles have a composition of $Fe_{84.3}B_{13.7}Cu_1C_1$.

4. The method of claim 1, wherein the first temperature is 500° C.

5. The method of claim 1, wherein in the pulverizing of the crystallized alloy ribbon to produce Fe—B—Cu—C alloy magnetic heating element particles, the magnetic heating element particles are produced by pulverizing the crystallized alloy ribbon at a low temperature with a cold ball grinder.

* * * * *